Figure 6:
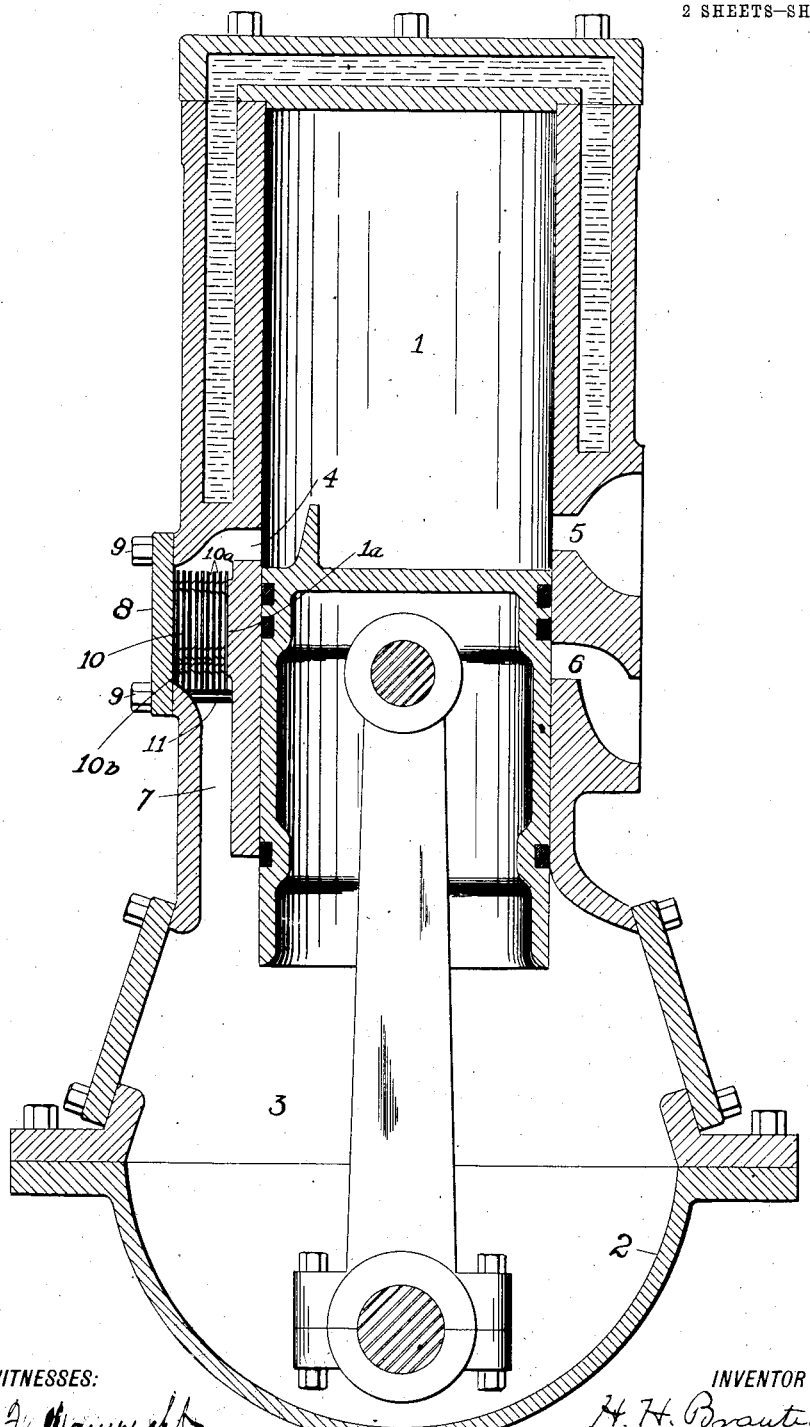

H. H. BRAUTIGAM.
INTERNAL COMBUSTION ENGINE.
APPLICATION FILED APR. 18, 1912.
1,085,844.
Patented Feb. 3, 1914.
2 SHEETS—SHEET 1.
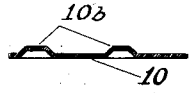
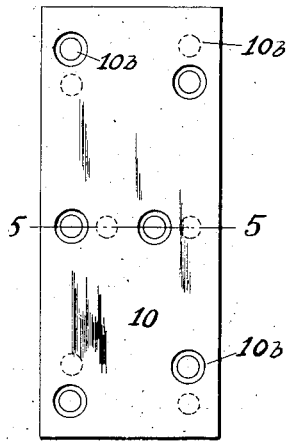
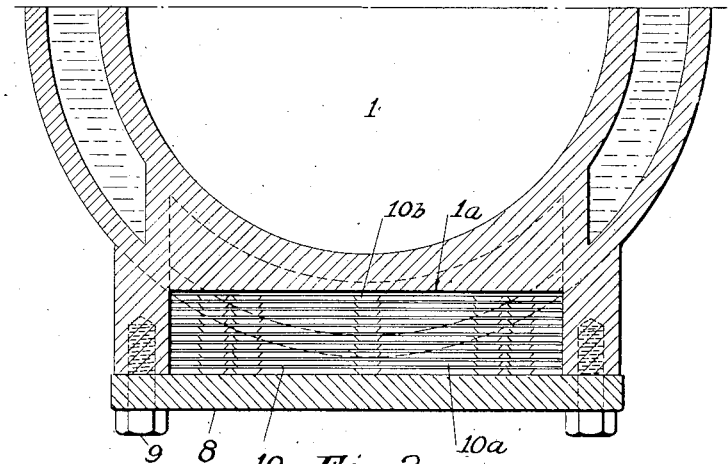
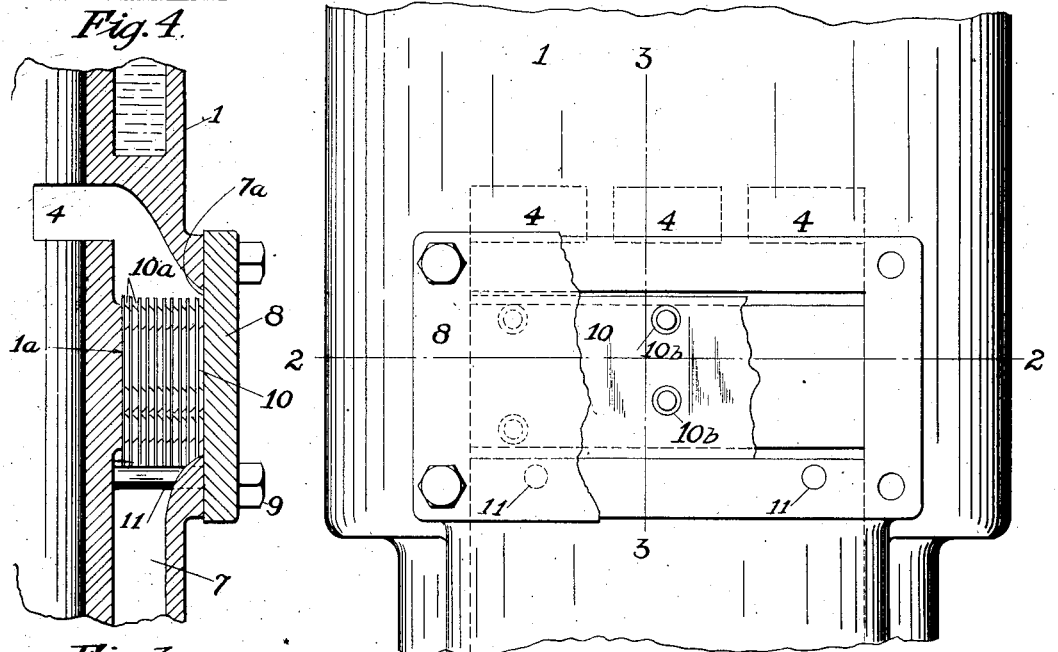
WITNESSES:
Marie F. Wainright
Jacob Lichtenstein
INVENTOR
H. H. Brautigam
BY
T. F. Bourne
ATTORNEY

UNITED STATES PATENT OFFICE.

HENRY H. BRAUTIGAM, OF BRIDGEPORT, CONNECTICUT, ASSIGNOR TO THE BRIDGE-PORT MOTOR CAR CO. INC., OF BRIDGEPORT, CONNECTICUT, A CORPORATION OF CONNECTICUT.

INTERNAL-COMBUSTION ENGINE.

1,085,844.  Specification of Letters Patent.  Patented Feb. 3, 1914.

Application filed April 18, 1912. Serial No. 691,618.

*To all whom it may concern:*

Be it known that I, HENRY H. BRAUTIGAM, a citizen of the United States, and resident of Bridgeport, in the county of Fairfield and State of Connecticut, have invented certain new and useful Improvements in Internal-Combustion Engines, of which the following is a specification.

In internal combustion engines of the two-cycle type there is danger of "back-firing" through the fuel inlet port, and this is particularly objectionable in two cycle gas engines utilizing the chamber in the crank base or casing as an initial compressing chamber for the fuel mixture.

The object of my invention is to provide simple and efficient means, located within the fuel passage between the chamber in the crank base or casing and the fuel inlet port, adapted to permit the free flow of the fuel mixture from said chamber to the working cylinder, and to prevent back firing or the flow of burning gases from the cylinder to said chamber.

In carrying out my invention I provide a plurality of parallel substantially flat plates, spaced apart, and located in the fuel passage to the engine cylinder, said plates being provided with projections, the projections of one plate abutting the surface of an adjacent plate, providing spaces between such plates permitting the free flow of fuel mixture to the inlet port of the cylinder, and preventing the flow of burning products of combustion from the cylinder through said passage.

My invention comprises novel details of improvement and combinations of parts that will be more fully hereinafter set forth and then pointed out in the claims.

Reference is to be had to the accompanying drawings forming part hereof, wherein, Figure 1 is a side elevation, partly broken away, of a two-cycle gas engine provided with my improvements; Fig. 2 is a section on the line 2, 2 in Fig. 1; Fig. 3 is a section on the line 3, 3 in Fig. 1; Fig. 4 is a face view of one of the screen plates used in the fuel inlet passage; Fig. 5 is a section on the line 5, 5 of Fig. 4, and Fig. 6 is a vertical section of a common type of gas engine or motor embodying my invention.

Similar numerals of reference indicate corresponding parts in the several views.

In the drawings I have illustrated the common three-port two-cycle gas engine, wherein the numeral 1 indicates the cylinder, 2 the crank-base or casing having the ordinary closed chamber 3, 4 the fuel inlet port or ports for the cylinder, 5 the exhaust port or ports, and 6 the fuel intake port for chamber 3. The passage 7 affords communication for the fuel mixture from chamber 3 to port 4. An opening $7^a$ on one side of passage 7 is maintained closed by the plate or cover 8 in any usual manner, as by screws 9. Within passage 7 are located a series of screen plates 10 placed side by side or one in front of the other, and spaced apart a short distance, providing the spaces $10^a$ between the plates open above and below. Plates 10 are preferably made of suitable thin flat metal, and are provided with projections $10^b$, shown stamped out of the plates a suitable distance apart and in staggered relation, whereby when the plates are assembled, as illustrated, they are spaced apart providing the spaces $10^a$ therebetween. The plates 10 may be placed in passage 7 through opening $7^a$ and are shown held pressed together between the wall $1^a$ and cover 8. Said plates may rest upon transverse pins 11 extending across passage 7. The projections $10^b$ of plates 10 are shown located in such staggered relation that all the plates may be stamped out similarly and when placed together may be reversed in position one with respect to two adjacent plates, whereby the projections $10^a$ of one plate will bear against the metal of the next plate without entering the recessed portion of the stamped out projections of the latter plate, as illustrated by full and dotted lines in Fig. 4. By this means the cost of manufacture is simplified and reduced, since similar plates may be used by merely reversing the positions of their projections with respect to each other.

By means of my improvements the plates 10 may be readily placed in position and as readily removed by merely removing cover 8, and said cover may firmly clamp said plates against wall $1^a$ to retain them in position. Thus facility is afforded for readily removing the plates for cleaning them. Since the spaces $10^a$ between plates 10 may, by means of my invention, be made relatively narrow, and since the plates 10 may be made relatively thin, it follows that a relatively large number of narrow spaces 10ᵃ may be provided in the passage between chamber 3 and port 4, which will permit the ready flow of the fuel mixture from said chamber to the cylinder, but which will prevent back firing or the flow of burning gases through passage 7 to chamber 3, thus preventing combustion in said chamber.

Having now described my invention what I claim is:—

1. An internal combustion engine having a passage and port communicating with its cylinder, and a plurality of parallel plates placed side by side and adjacent to one another in said passage, said plates having projections bearing against the adjacent plate spacing the plates apart providing passages therebetween, the projections of one plate being out of register with the projections of adjacent plates and means on the engine holding said plates pressed together.

2. An internal combustion engine having a passage and port communicating with its cylinder, said passage having a side opening, a cover removably secured over said opening, and a plurality of imperforate thin parallel plates within said passage in line with said opening, said plates having projections bearing against the next adjacent plate spacing said plates apart, the cover bearing against said plates and holding them pressed against an inner wall of said passage.

3. An internal combustion engine having a passage and port communicating with its cylinder, said passage having a side opening, a cover removably secured over said opening, and a plurality of plates within said passage in line with said opening, said plates having projections spacing said plates apart, the cover bearing against said plates and holding them pressed against an inner wall of said passage, screws holding the cover in place, and pins extending across said passage, said plates resting upon said pins.

4. An internal combustion engine having a passage and port communicating with its cylinder, and a plurality of parallel imperforate plates placed side by side in said passage, in a vertical position on edge said plates having projections in staggered relation to one another, the projections of one plate bearing against an adjacent plate and out of register with the projections of the last named plate, said projections separating said plates providing vertically disposed narrow spaces between said plates in communication with said passage, and means for clamping said plates together and detachably retaining said plates in said passage.

Signed at Bridgeport, in the county of Fairfield, and State of Connecticut, this 15th day of April A. D. 1912.

HENRY H. BRAUTIGAM.

Witnesses:
FRANK C. LYON,
C. E. FRAUENBERGER.

---

Correction in Letters Patent No. 1,085,844.

It is hereby certified that the assignee in Letters Patent No. 1,085,844, February 3, 1914, upon the application of Henry H. Brautigam, of Bridgeport, Connecticut, for an improvement in "Internal-Combustion Engines," was erroneously described and specified as "The Bridgeport Motor Car Co. Inc.," instead of as *The Bridgeport Motor Co. Inc.*, as shown by the records of assignments in this office; and that the said Letters Patent should be read with this correction therein that the same may conform to the record of the case in the Patent Office.

Signed and sealed this 24th day of February, A. D., 1914.

[SEAL.]

J. T. NEWTON,
*Acting Commissioner of Patents.*